United States Patent [19]

Mine et al.

[11] Patent Number: 5,708,054
[45] Date of Patent: Jan. 13, 1998

[54] TWO-PART CURABLE LIQUID SILICONE COMPOSITION

[75] Inventors: Katsutoshi Mine; Takae Takeuchi; Kimio Yamakawa, all of Chiba Prefecture, Japan

[73] Assignee: Dow Corning Toray Silicone Co., Ltd., Tokyo, Japan

[21] Appl. No.: 738,486

[22] Filed: Oct. 28, 1996

[30] Foreign Application Priority Data

Nov. 8, 1995 [JP] Japan .................. 7-314849

[51] Int. Cl.$^6$ .................................................. C08K 9/06
[52] U.S. Cl. .................. 523/212; 523/213; 524/265; 524/266; 524/267; 524/268; 524/730; 524/731
[58] Field of Search ...................... 524/730, 731, 524/265, 266, 267, 268; 523/212, 213

[56] References Cited

U.S. PATENT DOCUMENTS

| | | | |
|---|---|---|---|
| 4,477,626 | 10/1984 | Suzuki | 524/862 |
| 5,006,580 | 4/1991 | Kasuya et al. | 524/730 |
| 5,051,467 | 9/1991 | Okinoshima et al. | 524/731 |
| 5,312,855 | 5/1994 | Okami | 524/730 |
| 5,360,858 | 11/1994 | Fujiki et al. | 524/731 |

FOREIGN PATENT DOCUMENTS 62-229962 10/1987 Japan .

Primary Examiner—Melvyn I. Marquis
Attorney, Agent, or Firm—Paula J. Laguttuta

[57] ABSTRACT

A two-part composition comprising a liquid composition (I) composed of the components (A), (C), and (E) described below and a liquid composition (II) composed of the components (A) (B), (C), and (D) described below, which yield upon mixing a curable liquid silicone composition comprising (A) an alkenyl-substituted poyorganopolysiloxane;
(B) a hydrogen-substituted organopolysiloxane in an amount that provides 0.3 to 10 moles silicon-bonded hydrogen from component (B) per 1 mole alkenyl in component (A);
(C) an inorganic filler that has a specific surface of 50 to 500 $m^2/g$;
(D) an alkoxy-substituted organopolysiloxane; and
(E) platinum catalyst in a quantity sufficient to cure the instant composition;

wherein the curable silicone composition that results when liquid composition (I) and liquid composition (II) are mixed, is thixotropic and has a viscosity, immediately upon the mixing that is greater than the viscosity of liquid composition (II).

12 Claims, No Drawings

TWO-PART CURABLE LIQUID SILICONE COMPOSITION

BACKGROUND OF THE INVENTION

1. Field of the Invention

This invention relates to two-part curable liquid silicone compositions. More particularly, this invention relates to a two-part curable liquid silicone composition that is very storage-stable in its two-part form and that when mixed provides a thixotropic curable liquid silicone composition with a viscosity higher than either of the precursor parts.

2. Description of the Related Art

Addition reaction-curing liquid silicone compositions cure rapidly at room or elevated temperature to form silicone gels and silicone rubbers with excellent physical and electrical properties. This has led to the use of addition reaction-curing liquid silicone compositions as coatings, potting agents, and adhesives for electrical and electronic components. Curable liquid silicone compositions of this type are typically divided into two parts for storage and the two parts are mixed with each other to homogeneity just before application.

The contemporary trend toward the miniaturization of electrical and electronic components has created demand for improvements in the application characteristics of these curable liquid silicone compositions. In specific terms, it is desired that a composition be fluid during its dispenser application to the electrical or electronic component, but that it have a poor fluidity as soon as it has been applied to the electrical or electronic component. This behavior is desired because the fluidity of curable liquid silicone compositions, while affording an excellent coatability, also causes them to spread out after application to locations that are not to be coated. This has required a preliminary operation to enclose the component to be coated with a frame of rubber, metal, plastic, etc., in order to prevent the composition from spreading out (refer to Japanese Patent Application Laid Open (Kokai or Unexamined) Numbers 62-229962 (1987)). On the other hand, due to their poor processing qualities a number of issues arise in the case of curable silicone compositions rendered poorly fluid by a high content of an inorganic filler such as silica, alumina, titanium oxide, and the like. These issues include problems with filtration to eliminate foreign substances, difficult defoaming at the dispenser, and an inability to be uniformly coated on the electrical or electronic component.

Curable liquid organopolysiloxane compositions that contain silica micropowder and silanol-functional diorganosiloxane oligomer are known to exhibit thixotropy, that is, to be fluid under shear and poorly fluid at quiescence (refer to Japanese Patent Application Laid Open (Kokai or Unexamined) Number Sho 59-176347(176347/1984)).

When the present invention examined the curable liquid silicone composition disclosed in Japanese Patent Application Laid Open (Kokai or Unexamined) Number Sho 59-1763470 in a two-part formulation, they found that the two parts had a poor storage stability and also that the thixotropy varied with the passage of time.

As a result of extensive investigations directed to solving the problems described above, the inventors found that an excellent storage stability is obtained for the two parts when a curable liquid silicone composition containing inorganic filler and Si-bonded alkoxy-functional organopolysiloxane is divided into two parts having specific components. Moreover, it was found that mixing these two parts yields a thixotropic curable liquid silicone composition with a viscosity higher than either of the two parts. The present invention was achieved based on these discoveries.

In specific terms, then, the object of the present invention is to provide a two-part curable liquid silicone composition that is very storage stable in its two-part form and that upon mixing of its two parts yields a thixotropic curable liquid silicone composition with a viscosity higher than either part.

SUMMARY OF THE INVENTION

The present invention relates to a two-part curable liquid silicone composition characteristically comprising a liquid composition (I) substantially composed of the components (A), (C), and (E) described below and a liquid composition (II) substantially composed of the components (A), (B), (C), and (D) described below, which upon mixing yield a curable liquid silicone composition comprising (A) 100 parts by weight of an alkenyl-substituted organopolysiloxane having a viscosity at 25° C. of 10 to 1,000,000 centipoise and containing at least 2 alkenyl groups in each molecule;

(B) a hydrogen-substituted organopolysiloxane having a viscosity at 25° C. of 1 to 10,000 centipoise and containing at least 2 silicon-bonded hydrogen atoms in each molecule, in an amount that provides 0.3 to 10 moles silicon-bonded hydrogen from component (B) per 1 mole alkenyl in component (A);

(C) 2 to 50 weight parts inorganic filler that has a specific surface of 50 to 500 $m^2/g$;

(D) 0.1 to 20 parts by weight of an alkoxy-substituted organopolysiloxane having a viscosity at 25° C. of 1 to 2,000 centipoise and containing at least 2 silicon-bonded alkoxy groups in each molecule; and (E) platinum catalyst in a quantity sufficient to cure the instant composition;

wherein the curable silicone composition that results when liquid composition (I) and liquid composition (II) are mixed, is thixotropic and has a viscosity, immediately upon the mixing of liquid composition (I) and liquid composition (II), that is greater than the viscosity of liquid composition (I) and is greater than the viscosity of liquid composition (II).

DETAILED DESCRIPTION OF THE INVENTION

The two-part curable liquid silicone composition according to the present invention will be explained in greater detail in the following.

The two-part curable liquid silicone composition according to the present invention comprises liquid compositions (I) and (II) and yields a curable liquid silicone composition comprising the aforementioned components (A) to (E) when these two parts are mixed.

The organopolysiloxane (A), which is the base ingredient of the curable liquid silicone composition under consideration, contains at least 2 alkenyl groups in each molecule. This alkenyl is exemplified by vinyl, allyl, butenyl, pentenyl, hexenyl, and heptenyl with vinyl being specifically preferred. The alkenyl can be bonded, for example, in terminal and/or nonterminal position on the molecular chain. The non-alkenyl silicon-bonded groups in component (A) are exemplified by monovalent hydrocarbon groups, for example, alkyl groups such as methyl, ethyl, propyl, butyl, pentyl, hexyl, heptyl, octyl, and so forth; aryl groups such as phenyl, tolyl, xylyl, and so forth; aralkyl groups such as benzyl, phenethyl, and so forth; and haloalkyl groups such as 3-chloropropyl, 3,3,3- trifluoropropyl, and so forth. Methyl and phenyl are particularly preferred here. Component (A) can have, for example, a straight-chain, partially branched straight-chain, branched-chain, cyclic, or resin-like molecular structure. Component (A) can be a homopolymer with a molecular structure as described above or can be a mixture of polymers with the described molecular structures. However, when component (B) does not consist substantially of a straight-chain structure, component (A) should then consist substantially of a straight-chain structure in order for curing to yield a silicone gel or silicone rubber. The viscosity of component (A) at 25° C. should be in the range from 10 to 1,000,000 centipoise for the following reasons: a viscosity at 25° C. below 10 centipoise will cause the cured product to have an unsatisfactory mechanical strength; a viscosity at 25° C. in excess of 1,000,000 centipoise will cause the two parts to have a poor fluidity.

The hydrogen-substituted organopolysiloxane (B), which functions as crosslinker for the subject curable liquid silicone composition, contains at least 2 silicon-bonded hydrogen atoms in each molecule. This hydrogen can be bonded, for example, in terminal and/or nonterminal position on the molecular chain. The non-hydrogen silicon-bonded groups in component (B) are exemplified by monovalent hydrocarbon groups, for example, alkyl groups such as methyl, ethyl, propyl, butyl, pentyl, hexyl, heptyl, octyl, and so forth; aryl groups such as phenyl, tolyl, xylyl, and so forth; aralkyl groups such as benzyl, phenethyl, and so forth; and haloalkyl groups such as 3-chloropropyl, 3,3,3-trifluoropropyl, and so forth. Methyl and phenyl are particularly preferred here. Component (B) can have, for example, a straight-chain, partially branched straight-chain, branched-chain, cyclic, or resin-like molecular structure. Component (B) can be a homopolymer with a molecular structure as described above or can be a mixture of polymers with the described molecular structures. However, when component (A) does not consist substantially of a straight-chain structure, component (B) should then consist substantially of a straight-chain structure in order for curing to yield a silicone gel or silicone rubber. The viscosity of component (B) at 25° C. should be in the range from 1 to 10,000 centipoise for the following reasons: at a viscosity at 25° C. below 1 centipoise component (B) has a ready tendency to evaporate, which causes instability in the component proportions; a poor fluidity for the two-part system will be encountered in some cases at a viscosity at 25° C. in excess of 10,000 centipoise.

Component (B) is added to the curable liquid silicone composition under consideration in a quantity that provides from 0.3 to 10 moles silicon-bonded hydrogen from component (B) per 1 mole alkenyl in component (A). The composition will not undergo a thorough cure when component (B) provides less than 0.3 mole silicon-bonded hydrogen per 1 mole alkenyl in component (A). The cured product, on the other hand, will have a poor mechanical strength when component (B) provides more than 10 moles silicon-bonded hydrogen per 1 mole alkenyl in component (A).

The inorganic filler (C), through its mixture with component (D), imparts thixotropy and high viscosity to the curable liquid silicone composition. Component (C) should have a specific surface of 50 to 500 m$^2$/g for the following reasons: thixotropy cannot be readily imparted to the composition at a specific surface below 50 m$^2$/g; at above 500 m$^2$/g the composition has a poor fluidity and adjusting or controlling its viscosity also becomes problematic. Component (C) is exemplified by silica, alumina, titanium oxide, and glass, wherein silica is preferred and fumed silica is even more preferred.

Also usable as component (C) is inorganic filler whose surface has been treated with a surface-treatment agent. This surface-treatment agent is exemplified by organoalkoxysilanes such as methyltrimethoxysilane, vinyltrimethoxysilane, 3-glycidoxypropyltrimethoxysilane, 2-(3,4-epoxycyclohexyl)ethyltrimethoxysilane, 3-methacryloxypropyltrimethoxysilane, 3-aminopropyltriethoxysilane, and N-(2-aminoethyl)-3-aminopropyltrimethoxysilane; organochlorosilanes such as methyltrichlorosilane, dimethyldichlorosilane, and trimethylchlorosilane; silazanes such as 1,1,1,3,3,3-hexamethyldisilazane and 1,1,3,3,5,5-hexamethylcyclotrisilazane; and organosiloxane oligomers such as silanol-endblocked dimethylsiloxane oligomers, silanol-endblocked methylvinylsiloxane oligomers, and silanol-endblocked methylphenylsiloxane oligomers. The surface of component (C) can be treated with the surface-treatment agent, for example, by blending component (C) into a mixture prepared by preliminarily mixing the surface-treatment agent uniformly into component (A). Another example of the treatment method consists of mixing component (C) with the surface-treatment agent itself or with its organic solution prepared by diluting the surface-treatment agent with an organic solvent such as methanol, ethanol, hexane, heptane, toluene, xylene, or the like.

Component (C) is used in the curable liquid silicone composition at from 2 to 50 weight parts per 100 weight parts component (A). Thixotropy cannot be readily imparted to the composition when component (C) is used at less than 2 weight parts per 100 weight parts component (A). The two parts will have a poor fluidity when component (C) is used at more than 50 weight parts per 100 weight parts component (A), which creates such problems as a difficult filtration for the purpose of removing foreign substances, difficulties in defoaming the two parts at the dispenser, and an inability to uniformly apply the composition.

The alkoxy-substituted organopolysiloxane (D), through its mixture with component (C), imparts thixotropy and high viscosity to the curable liquid silicone composition under consideration. Component (D) contains at least 2 silicon-bonded alkoxy groups in each molecule. This alkoxy group is exemplified by methoxy, ethoxy, propoxy, and butoxy with methoxy being specifically preferred. The non-alkoxy silicon-bonded groups in component (D) are exemplified by monovalent hydrocarbon groups, for example, alkyl groups such as methyl, ethyl, propyl, butyl, pentyl, hexyl, heptyl, octyl, and so forth; alkenyl groups such as vinyl, allyl, butenyl, pentenyl, hexenyl, and so forth; aryl groups such as phenyl, tolyl, xylyl, and so forth; aralkyl groups such as benzyl, phenethyl, and so forth; and haloalkyl groups such as 3-chloropropyl, 3,3,3-trifluoropropyl, and so forth. The non-alkoxy silicon-bonded groups in component (D) are also exemplified by the hydrogen atom and functionalized organic groups such as 3-glycidoxypropyl, 2-(3,4-epoxycyclohexyl)ethyl, and 3-methacryloxypropyl. The presence of at least 1 epoxy-functional organic group, such as 3-glycidoxypropyl or 2-(3,4-epoxycyclohexyl)ethyl, is preferred. Component (D) can have, for example, a straight-chain, partially branched straight-chain, branched-chain, cyclic, or resin-like molecular structure. The viscosity of component (D) at 25° C. should be in the range from 1 to 2,000 centipoise for the following reasons: at a viscosity at 25° C. below 1 centipoise component (D) has a strong tendency to evaporate, which causes instability in the component proportions; a satisfactory thixotropy cannot be imparted to the composition at a viscosity at 25° C. in excess of 2,000 centipoise.

Preferred examples of the organopolysiloxane (D) are the organopolysiloxane with the following structure

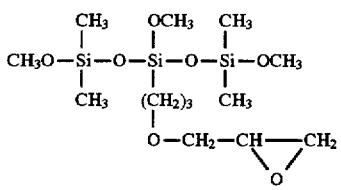

the organopolysiloxane with the following structure

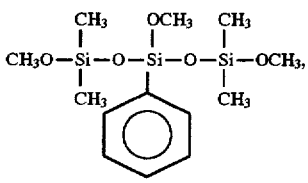

organopolysiloxane with the following structure in which m is an integer with a value of at least 1

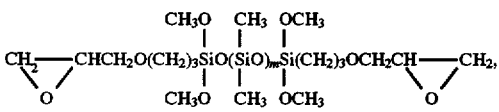

organopolysiloxane with the following structure in which m and n are both integers with a value of at least

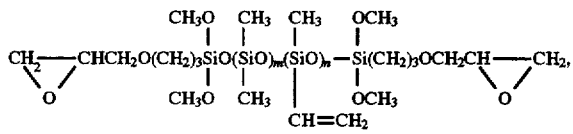

and organopolysiloxane with the following structure in which m and n are both integers with a value of at least 1

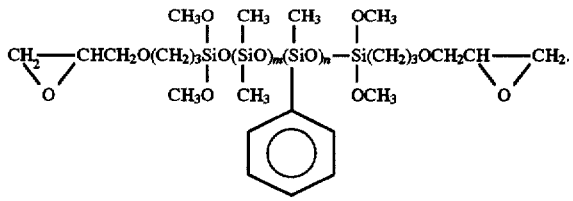

Component (D) is used in the subject curable liquid silicone composition at from 0.1 to 20 weight parts per 100 weight parts component (A). Thixotropy cannot be readily imparted to the composition when component (D) is used at less than 0.1 weight part per 100 weight parts component (A). The use of more than 20 weight parts per 100 weight parts component (A) leads to such problems as a reduced storage stability for the two-part system and a poor mechanical strength for the cured product.

The platinum catalyst (E) is a catalyst of the addition reaction-mediated cure of the curable liquid silicone composition under consideration. Component (E) is exemplified by platinum black, platinum-on-silica micropowder, platinum-on-active carbon, platinum-on-alumina powder, chloroplatinic acid, alcohol solutions of chloroplatinic acid, platinum-olefin complexes, platinum-alkenylsiloxane complexes, and thermoplastic resin powders with a particle size no larger than 10 micrometers that contain a platinum catalyst as described above. The thermoplastic resin here is exemplified by polystyrene resins, nylon resins, polycarbonate resins, silicone resins, and so forth.

Component (E) is used in the curable liquid silicone composition under consideration in a quantity sufficient to cure the composition. In specific terms, component (E) is preferably used in a quantity that provides from 1 to 1,000 weight-ppm platinum metal in the present composition.

The two-part curable liquid silicone composition according to the present invention comprises the liquid composition (I) substantially composed of the above-described components (A), (C), and (E) and the liquid composition (II) substantially composed of the above-described components (A), (B), (C), and (D). Thus, components (A) and (C) are present in each of liquid compositions (I) and (II), and they are preferably mixed therein so as to equalize the viscosities of these liquid compositions. Thixotropy is induced when components (C) and (D) in the two-part curable liquid silicone composition according to the present invention are mixed with each other. Although liquid composition (II) will thus also be somewhat thixotropic since it contains component (D) mixed with part of component (C), the viscosities of liquid compositions (I) and (II) can be equalized taking this into account. In addition, while component (D) is substantially mixed into liquid composition (II), a portion of component (D) can be used in liquid composition (I). Mixing these two parts yields a curable liquid silicone composition that can cure into a silicone gel or silicone rubber. This composition can be cured at room temperature or by heating. The heating temperature for the composition is preferably, for example, in the range from 50° C. to 200° C.

The two-part curable liquid silicone composition according to the present invention comprises the liquid compositions (I) and (II), which prior to their mixing are fluid and which immediately upon their mixing yield a thixotropic, high-viscosity curable liquid silicone composition. The viscosity of the curable liquid silicone composition immediately post-mixing can be any viscosity that is higher than either of the two parts, but it is preferably 1.3- to 30-times and more preferably is 1.5- to 20-times the viscosity of the part with the higher viscosity. In reference to this, since the curable liquid silicone composition is thixotropic as soon as mixing has occurred, its viscosity must be measured and compared under the same conditions used to measure the viscosity of the two parts, for example, using the same rotational viscometer, the same spindle number, and the same spindle rpm. The thixotropy of the curable liquid silicone composition afforded by mixing the two parts can be expressed by the ratio between viscosities measured using the same spindle number at different spindle rpms. The thixotropy can be expressed, for example, by using the same spindle number at two spindle rpms standing in a 1:10 ratio and determining the ratio of the viscosity at the lower spindle rpm to the viscosity at the higher spindle rpm. The two-part curable liquid silicone composition according to the present invention preferably has a ratio calculated in this manner of at least 1.1 and more preferably of at least 1.2. Since the two-part curable liquid silicone composition according to the present invention exhibits thixotropic behavior immediately upon the mixing of its two parts, its coating operations are preferably carried out using a dispenser equipped with a mixing device such as a static mixer. The dispenser can also be equipped with means for defoaming the two parts and means for filtering off foreign material.

The curable liquid silicone composition afforded by mixing the two parts is well-suited for coating even on vertical surfaces since it is thixotropic and loses its fluidity at quiescence.

While mixing the two-part curable liquid silicone composition according to the present invention yields the curable liquid silicone composition comprising the above-described components (A) to (E), an addition-reaction inhibitor can also be admixed as an optional component. Said addition-reaction inhibitors are exemplified by alkyne alcohols such as 3-methyl-1-butyn-3-ol, 3,5-dimethyl-1-hexyn-3-ol, and 3-phenyl-1-butyn-3-ol; ene-yne compounds such as 3-methyl-3-penten-1-yne and 3,5-dimethyl-3-hexen-1-yne; 1,3,5,7-tetramethyl-1,3,5,7-tetravinylcyclotetrasiloxane; 1,3,5,7-tetramethyl-1,3,5,7-tetrahexenylcyclotetrasiloxane; benzotriazole; and the like. The addition-reaction inhibitor can be mixed into either of liquid compositions (I) and (II), but is preferably added to composition (II). The addition-reaction inhibitor is preferably used at from 10 to 50,000 weight-ppm in the curable liquid silicone composition under consideration.

Other optional components that can also be admixed are, for example, inorganic fillers other than component (C), such as titanium dioxide, carbon black, alumina, quartz powder, glass, and the like; metal powders such as those of silver, nickel, copper, and so forth; the powders of resins such as fluororesins and silicone resins; adhesion promoters; heat stabilizers; flame retardants; colorants; and organic solvents. These components can be mixed into either of liquid compositions (I) and (II).

The two-part curable liquid silicone composition according to the present invention has a relatively low viscosity and excellent handling characteristics prior to the mixing of its two parts. As a consequence, it is easily filled into the dispenser and, once filled, the two parts are easily defoamed and easily filtered to remove foreign material. Moreover, mixing these two parts and application of the resulting composition gives a coated composition that immediately exhibits a high viscosity and thixotropic behavior. As a result of these features, the two-part curable liquid silicone composition according to the present invention is well qualified for coating operations that require precision application, such as the coating of semiconductors, the partial-surface moistureproof coating of electric circuit substrates, and the coating of optical fibers.

EXAMPLES

The two-part curable liquid silicone composition according to the present invention will be explained in greater detail through working examples. The viscosity was measured in the examples at 25° C. using a single-cylinder rotational viscometer (Vismetron VG-A1 from the Shibaura System Company).

EXAMPLE 1

The following were mixed to homogeneity to give a liquid composition (i) that corresponded to liquid composition (I):
as component A, 39.9 weight parts dimethylvinylsiloxy-endblocked dimethylpolysiloxane with a viscosity of 2,000 centipoise and a vinyl content of 0.23 weight %;
as component (C), 10 weight parts hydrophobicized fumed silica with a specific surface of 200 m²/g (surface pre-treated with 1,1,1,3,3,3-hexamethyldisilazane); and
as component (E), 0.1 weight part of a 1 weight % isopropanolic chloroplatinic acid solution.

Liquid composition (i) had a viscosity of 40,000 centipoise as measured with spindle no. 4 at a spindle speed of 6 rpm.

The following were mixed to homogeneity to give a liquid composition (ii) that corresponded to liquid composition (II):
as component (A), 41.5 weight parts of the above-described dimethylpolysiloxane;
as component (B), 1.5 weight parts trimethylsiloxy-endblocked methylhydrogenpolysiloxane with a viscosity of 20 centipoise and a silicon-bonded hydrogen content of 1.56 weight %;
as component (C), 6 weight parts of the above-described fumed silica;
as component (D), 1 weight part organopolysiloxane (viscosity=10 centipoise) with the formula

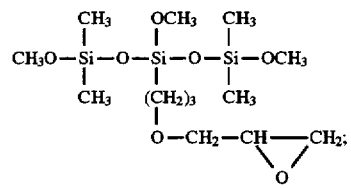

and
as addition-reaction inhibitor, 0.01 weight part 3-phenyl-1-butyn-3-ol.

Liquid composition (ii) had a viscosity of 45,000 centipoise as measured with spindle no. 4 at a spindle speed of 6 rpm.

50 weight parts liquid composition (i) and 50 weight parts liquid composition (ii) were mixed to homogeneity to give a curable liquid silicone composition with a viscosity immediately post-mixing of 85,000 centipoise as measured with spindle no. 4 at a spindle speed of 6 rpm. The viscosity of this composition was 120,000 centipoise when measured with spindle no. 4 at a speed of 3 rpm. Heating this composition at 150° C. for 30 minutes gave a silicone rubber with a durometer hardness (JIS A) of 40.

Liquid compositions (i) and (ii) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (i) and (ii) in the two tanks were subsequently visually inspected, both were found to be free of bubbles and a complete defoaming was found to have occurred. A curable liquid silicone composition was then prepared by air-pressurizing the tanks and mixing equal amounts of liquid composition (i) and liquid composition (ii) to homogeneity. The resulting curable liquid silicone composition was found to be free of bubbles by visual inspection.

Liquid compositions (i) and (ii) were also held for 1 month at 50° C. Viscosity measurements on the aged compositions showed that their viscosities had not changed.

COMPARATIVE EXAMPLE 1

The following were mixed to homogeneity to give a liquid composition (iii) that corresponded to liquid composition (I):
as component A, 33.9 weight parts dimethylvinylsiloxy-endblocked dimethylpolysiloxane with a viscosity of 2,000 centipoise and a vinyl content of 0.23 weight %;
as component (C), 16 weight parts hydrophobicized fumed silica with a specific surface of 200 m²/g (surface pre-treated with 1,1,1,3,3,3-hexamethyldisilazane); and
as component (E), 0.1 weight part of a 1 weight % isopropanolic chloroplatinic acid solution.

Liquid composition (iii) had a viscosity of 130,000 centipoise as measured with spindle no. 4 at a spindle speed of 3 rpm. This composition had a viscosity of at least 100,000 centipoise (upper measurement limit) when measurement was carried out using spindle no. 4 at 6 rpm.

The following were mixed to homogeneity to give a liquid composition (iv) that corresponded to liquid composition (II):

as component (A), 47.5 weight parts of the above-described dimethylpolysiloxane;

as component (B), 1.5 weight parts trimethylsiloxy-endblocked methylhydrogenpolysiloxane with a viscosity of 20 centipoise and a silicon-bonded hydrogen content of 1.56 weight %;

as component (D), 1 weight part organopolysiloxane (viscosity=10 centipoise) with the formula

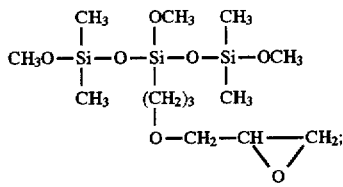

and as addition-reaction inhibitor, 0.01 weight part 3-phenyl-1-butyn-3-ol.

Liquid composition (iv) had a viscosity of 1,500 centipoise as measured with spindle no. 4 at a spindle speed of 60 rpm. This composition had a viscosity less than or equal to 10,000 centipoise (lower measurement limit) when measurement was carried out using spindle no. 4 at 6 rpm.

50 weight parts liquid composition (iii) and 50 weight parts liquid composition (iv) were mixed to homogeneity to give a curable liquid silicone composition with a viscosity immediately post-mixing of 85,000 centipoise as measured with spindle no. 4 at a spindle speed of 8 rpm. The viscosity of this composition was 120,000 centipoise when measured with spindle no. 4 at a speed of 3 rpm. Heating this composition at 150° C. for 30 minutes gave a silicone rubber with a durometer hardness (JIS A) of 40.

Liquid compositions (iii) and (iv) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (iii) and (iv) in the two tanks were subsequently visually inspected, no bubbles were found in liquid composition (iv), but bubbles were found to be present in liquid composition (iii). A curable liquid silicone composition was then prepared by air-pressurizing the tanks and mixing equal amounts of liquid composition (iii) and liquid composition (iv) to homogeneity. Visual inspection determined that bubbles were present in the resulting curable liquid silicone composition.

Liquid compositions (iii) and (iv) were also held for 1 month at 50° C. Viscosity measurements on the aged compositions showed that their viscosities had not changed.

COMPARATIVE EXAMPLE 2

The following were mixed to homogeneity to give a liquid composition (v) that corresponded to liquid composition (I):

as component A, 49.9 weight parts dimethylvinylsiloxy-endblocked dimethylpolysiloxane with a viscosity of 2,000 centipoise and a vinyl content of 0.23 weight % and as component (E), 0.1 weight part of a 1 weight % isopropanolic chloroplatinic acid solution.

Liquid composition (v) had a viscosity of 2,000 centipoise as measured with spindle no. 4 at a spindle speed of 60 rpm. This composition had a viscosity less than or equal to 10,000 centipoise (lower measurement limit) when measurement was carded out using spindle no. 4 at 6 rpm.

The following were mixed to homogeneity to give a liquid composition (vi) that corresponded to liquid composition (II):

as component (A), 31.5 weight parts of the above-described dimethylpolysiloxane;

as component (B), 1.5 weight parts trimethylsiloxy-endblocked methylhydrogenpolysiloxane with a viscosity of 20 centipoise and a silicon-bonded hydrogen content of 1.56 weight %;

as component (C), 16 weight parts hydrophobicized fumed silica with a specific surface of 200 $m^2/g$ (surface pretreated with 1,1,1,3,3,3-hexamethyldisilazane);

1 weight part organopolysiloxane (viscosity=10 centipoise as component (D),) with the formula

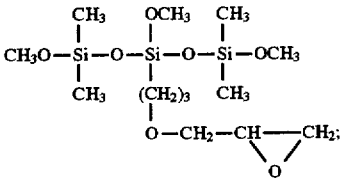

and as addition-reaction inhibitor, 0.01 weight part 3-phenyl-1-butyn-3-ol.

Liquid composition (vi) had a viscosity of 190,000 centipoise measured with spindle no. 4 at a spindle speed of 3 rpm. This composition had a viscosity of at least 100,000 centipoise (upper measurement limit) when measurement was carried out using spindle no. 4 at 6 rpm.

50 weight parts liquid composition (v) and 50 weight parts liquid composition (vi) were mixed to homogeneity to give a curable liquid silicone composition with a viscosity immediately post-mixing of 85,000 centipoise as measured with spindle no. 4 at a spindle speed of 6 rpm. The viscosity of this composition was 120,000 centipoise when measured with spindle no. 4 at a speed of 3 rpm. Heating this composition at 150° C. for 30 minutes gave a silicone rubber.

Liquid compositions (v) and (vi) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (v) and (vi) in the two tanks were subsequently visually inspected, no bubbles were found in liquid composition (v), but bubbles were found to be present in liquid composition (vi). A curable liquid silicone composition was then prepared by air-pressurizing the tanks and mixing equal amounts of liquid composition (v) and liquid composition (vi) to homogeneity. Visual inspection determined that bubbles were present in the resulting curable liquid silicone composition.

Liquid compositions (v) and (vi) were also held for 1 month at 50° C. Viscosity measurements on the aged compositions showed that their viscosities had not changed.

EXAMPLE 2

The following were mixed to homogeneity to give a liquid composition (vii) that corresponded to liquid composition (I):

as component A, 39.9 weight parts dimethylvinylsiloxy-endblocked dimethylpolysiloxane with a viscosity of 2,000 centipoise and a vinyl content of 0.23 weight %;

as component (C), 10 weight parts hydrophobicized fumed silica with a specific surface of 200 m²/g (surface pretreated with 1,1,1,3,3,3-hexamethyldisilazane); and as component (E), 0.1 weight part of a 1 weight % isopropanolic chloroplatinic acid solution.

Liquid composition (vii) had a viscosity of 40,000 centipoise as measured with spindle no. 4 at a spindle speed of 6 rpm.

The following were mixed to homogeneity to give a liquid composition (viii) that corresponded to liquid composition (II):

as component (A), 41.5 weight parts of the above-described dimethylpolysiloxane;

as component (B), 1.5 weight parts trimethylsiloxy-endblocked methylhydrogenpolysiloxane with a viscosity of 20 centipoise and a silicon-bonded hydrogen content of 1.56 weight %;

as component (C), 6 weight parts of the above-described fumed silica;

as component (D), 1 weight part organopolysiloxane (viscosity=10 centipoise) with the formula

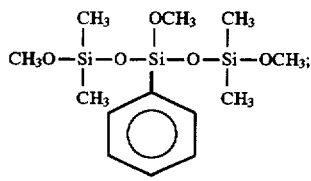

and as addition-reaction inhibitor, 0.01 weight part 3-phenyl-1-butyn-3-ol.

Liquid composition (viii) had a viscosity of 45,000 centipoise as measured with spindle no. 4 at a spindle speed of 6 rpm.

50 weight parts liquid composition (vii) and 50 weight parts liquid composition (viii) were mixed to homogeneity to give a curable liquid silicone composition with a viscosity immediately post-mixing of 110,000 centipoise as measured with spindle no. 4 at a spindle speed of 3 rpm. The viscosity of this composition was 150,000 centipoise when measured with spindle no. 4 at a speed of 1.5 rpm. The viscosity of this composition was at least 100,000 centipoise (upper measurement limit) when measured with spindle no. 4 at a speed of 6 rpm. Heating this composition at 150° C. for 30 minutes gave a silicone rubber with a durometer hardness (JIS A) of 40.

Liquid compositions (vii) and (viii) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (vii) and (viii) in the two tanks were subsequently visually inspected, no bubbles were found to be present in either composition and a complete defoaming was found to have occurred. A curable liquid silicone composition was then prepared by air-pressurizing the tanks and mixing equal amounts of liquid composition (vii) and liquid composition (viii) to homogeneity. The resulting curable liquid silicone composition was found to be free of bubbles by visual inspection.

Liquid compositions (vii) and (viii) were also held for 1 month at 50° C. Viscosity measurements on the aged compositions showed that their viscosities had not changed.

COMPARATIVE EXAMPLE 3

The following were mixed to homogeneity to give a liquid composition (ix) that corresponded to liquid composition (I):

as component A, 33.9 weight parts dimethylvinylsiloxy-endblocked dimethylpolysiloxane with a viscosity of 2,000 centipoise and a vinyl content of 0.23 weight %;

as component (C), 16 weight parts hydrophobicized fumed silica with a specific surface of 200 m²/g (surface pretreated with 1,1,1,3,3,3-hexamethyldisilazane); and as component (E), 0.1 weight part of a 1 weight % isopropanolic chloroplatinic acid solution.

Liquid composition (ix) had a viscosity of 130,000 centipoise as measured with spindle no. 4 at a spindle speed of 3 rpm.

The following were mixed to homogeneity to give a liquid composition (x) that corresponded to liquid composition (II):

as component (A), 47.5 weight parts of the above-described dimethylpolysiloxane;

as component (B), 1.5 weight parts trimethylsiloxy-endblocked methylhydrogenpolysiloxane with a viscosity of 20 centipoise and a silicon-bonded hydrogen content of 1.56 weight %;

as component (D), 1 weight part organopolysiloxane (viscosity=10 centipoise) with the formula

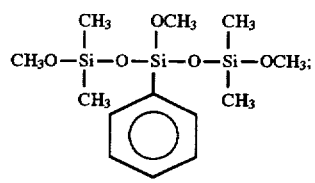

and as addition-reaction inhibitor, 0.01 weight part 3-phenyl-1-butyn-3-ol.

Liquid composition (x) had a viscosity of 1,400 centipoise as measured with spindle no. 4 at a spindle speed of 60 rpm. This composition had a viscosity as measured by spindle no. 4 at 3 rpm of less than or equal to 100,000 centipoise (lower measurement limit).

50 weight parts liquid composition (ix) and 50 weight parts liquid composition (x) were mixed to homogeneity to give a curable liquid silicone composition with a viscosity immediately post-mixing of 110,000 centipoise as measured with spindle no. 4 at a spindle speed of 3 rpm. The viscosity of this composition was 150,000 centipoise when measured with spindle no. 4 at a speed of 1.5 rpm. The viscosity of this composition was at least 100,000 centipoise (upper measurement limit) when measured with spindle no. 4 at a speed of 6 rpm. Heating this composition at 150° C. for 30 minutes gave a silicone rubber with a durometer hardness (JIS A) of 40.

Liquid compositions (ix) and (x) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (ix) and (x) in the two tanks were subsequently visually inspected, liquid composition (x) was found to be free of bubbles, but liquid composition (ix) was found to contain bubbles. A curable liquid silicone composition was then prepared by air-pressurizing the tanks and mixing equal amounts of liquid composition (ix) and liquid composition (x) to homogeneity. Visual inspection determined that bubbles were present in the resulting curable liquid silicone composition.

Liquid compositions (ix) and (x) were also held for 1 month at 50° C. Viscosity measurements on the aged compositions showed that their viscosities had not changed.

COMPARATIVE EXAMPLE 4

The following were mixed to homogeneity to give a liquid composition (xi) that corresponded to liquid composition (I):
as component A, 49.9 weight parts dimethylvinylsiloxy-endblocked dimethylpolysiloxane with a viscosity of 2,000 centipoise and a vinyl content of 0.23 weight % and
as component (E), 0.1 weight part of a 1 weight % isopropanolic chloroplatinic acid solution.

Liquid composition (xi) had a viscosity of 2,000 centipoise measured with spindle no. 4 at a spindle speed of 60 rpm. This composition had a viscosity as measured by spindle no. 4 at 3 rpm of less than or equal to 100,000 centipoise (lower measurement limit).

The following were mixed to homogeneity to give a liquid composition (xii) that corresponded to liquid composition (II):
as component (A), 31.5 weight parts of the above-described dimethylpolysiloxane;
as component (B), 1.5 weight parts trimethylsiloxy-endblocked methylhydrogenpolysiloxane with a viscosity of 20 centipoise and a silicon-bonded hydrogen content of 1.56 weight %;
as component (C), 16 weight parts hydrophobicized fumed silica with a specific surface of 200 m²/g (surface pretreated with 1,1,1,3,3,3-hexamethyldisilazane);
as component (D), 1 weight part organopolysiloxane (viscosity=10 centipoise) with the formula

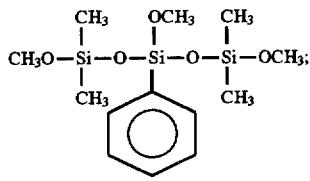

and
as addition-reaction inhibitor, 0.01 weight part 3-phenyl-1-butyn-3-ol.

Liquid composition (xii) had a viscosity of 196,000 centipoise as measured with spindle no. 4 at a spindle speed of 3 rpm.

50 weight parts liquid composition (xi) and 50 weight parts liquid composition (xii) were mixed to homogeneity to give a curable liquid silicone composition with a viscosity immediately post-mixing of 110,000 centipoise as measured with spindle no. 4 at a spindle speed of 3 rpm. The viscosity of this composition was 150,000 centipoise when measured with spindle no. 4 at a speed of 1.5 rpm. Heating this composition at 150° C. for 30 minutes gave a silicone rubber with a durometer hardness (JIS A) of 40.

Liquid compositions (xi) and (xii) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (xi) and (xii) in the two tanks were subsequently visually inspected, liquid composition (xi) was found to be free of bubbles, but liquid composition (xii) was found to contain bubbles. A curable liquid silicone composition was then prepared by air-pressurizing the tanks and mixing equal amounts of liquid composition (xi) and liquid composition (xii) to homogeneity. Visual inspection determined that bubbles were present in the resulting curable liquid silicone composition.

Liquid compositions (xi) and (xii) were also held for 1 month at 50° C. Viscosity measurements on the aged compositions showed that their viscosities had not changed.

COMPARATIVE EXAMPLE 5

A liquid composition (vii) that corresponded to liquid composition (I) was prepared as in Example 2. Liquid composition (vii) had a viscosity of 40,000 centipoise as measured by spindle no. 4 at a spindle speed of 6 rpm.

The following were mixed to homogeneity to give a liquid composition (xiii) that corresponded to liquid composition (II):
as component(A), 41.5 weight parts dimethylvinylsiloxy-endblocked dimethylpolysiloxane with a viscosity of 2,000 centipoise and a vinyl content of 0.23 weight %;
as component (B), 1.5 weight parts trimethylsiloxy-endblocked methylhydrogenpolysiloxane with a viscosity of 20 centipoise and a silicon-bonded hydrogen content of 1.56 weight %;
as component (C), 6 weight parts hydrophobicized fumed silica with a specific surface of 200 m²/g (surface pretreated with 1,1,1,3,3,3-hexamethyldisilazane);
in place of component (D): 1 weight part trimethylsiloxy-endblocked dimethylpolysiloxane with a viscosity of 40 centipoise; and
as addition-reaction inhibitor, 0.01 weight part 3-phenyl-1-butyn-3-ol.

Liquid composition (xiii) had a viscosity of 5,000 centipoise as measured with spindle no. 4 at a spindle speed of 60 rpm. This composition had a viscosity of less than or equal to 10,000 centipoise (lower measurement limit) when measured with spindle no. 4 at a speed of 6 rpm.

50 weight parts liquid composition (vii) and 50 weight parts liquid composition (xiii) were mixed to homogeneity to give a curable liquid silicone composition with a viscosity immediately post-mixing of 13,000 centipoise as measured with spindle no. 4 at a spindle speed of 6 rpm. Heating this composition at 150° C. for 30 minutes gave a silicone rubber with a durometer hardness (JIS A) of 40.

Liquid compositions (vii) and (xiii) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (vii) and (xiii) in the two tanks were subsequently visually inspected, both were found to be free of bubbles and a complete defoaming was found to have occurred. A curable liquid silicone composition was then prepared by air-pressurizing the tanks and mixing equal amounts of liquid composition (vii) and liquid composition (xiii) to homogeneity. The resulting curable liquid silicone composition was found to be free of bubbles by visual inspection.

Liquid compositions (vii) and (xiii) were also held for 1 month at 50° C. While the viscosity of liquid composition (vii) remained unchanged, liquid composition (xiii) underwent thickening as evidenced by its viscosity of 12,000 centipoise measured using spindle no. 4 at a spindle speed of 6 rpm.

COMPARATIVE EXAMPLE 6

A liquid composition (vii) that corresponded to liquid composition (I) was prepared as in Example 2. Liquid composition (vii) had a viscosity of 40,000 centipoise as measured by spindle no. 4 at a spindle speed of 6 rpm.

The following were mixed to homogeneity to give a liquid composition (xiv) that corresponded to liquid composition (II):
as component (A), 41.5 weight parts dimethylvinylsiloxy-endblocked dimethylpolysiloxane with a viscosity of 2,000 centipoise and a vinyl content of 0.23 weight %;

as component (B), 1.5 weight parts trimethylsiloxy-endblocked methylhydrogenpolysiloxane with a viscosity of 20 centipoise and a silicon-bonded hydrogen content of 1.56 weight %;

as component (C), 6 weight parts hydrophobicized fumed silica with a specific surface of 200 m²/g (surface pretreated with 1,1,1,3,3,3-hexamethyldisilazane);

in place of component (D): 1 weight part dimethylhydroxysiloxy-endblocked dimethylpolysiloxane with a viscosity of 40 centipoise; and as addition-reaction inhibitor, 0.01 weight part 3-phenyl-1-butyn-3-ol.

Liquid composition (xiv) had a viscosity of 45,000 centipoise as measured with spindle no. 4 at a spindle speed of 6 rpm.

50 weight parts liquid composition (vii) and 50 weight parts liquid composition (xiv) were mixed to homogeneity to give a curable liquid silicone composition with a viscosity immediately post-mixing of 180,000 centipoise as measured with spindle no. 4 at a spindle speed of 3 rpm. Heating this composition at 150° C. for 30 minutes gave a silicone rubber with a durometer hardness (JIS A) of 40.

Liquid compositions (vii) and (xiv) were separately loaded (500 g each) into the 2 tanks of a dispenser equipped with a static mixer for mixing the two parts and with 2 depressurizable tanks with capacities of about 800 mL. Each of these tanks was then placed under a vacuum of 5 mmHg for 5 minutes. When the liquid compositions (vii) and (xiv) in the two tanks were subsequently visually inspected, both were found to be free of bubbles and a complete defoaming was found to have occurred. A curable liquid silicone composition was then prepared by air-pressurizing the tanks and mixing equal amounts of liquid composition (vii) and liquid composition (xiv) to homogeneity. The resulting curable liquid silicone composition was found to be free of bubbles by visual inspection.

Liquid compositions (vii) and (xiv) were also held for 1 month at 50° C. While the viscosity of liquid composition (vii) remained unchanged, liquid composition (xiv) underwent a decline in viscosity as evidenced by its viscosity of 36,000 centipoise measured using spindle no. 4 at a spindle speed of 6 rpm.

The two-part curable liquid silicone composition according to the present invention is characterized by an excellent storage stability for its two parts and by facile defoaming of its two parts—which are fluids—prior to their mixing. The invention composition is also characterized in that mixing its two parts gives a thixotropic curable liquid silicone composition with a viscosity higher than either of the two parts.

That which is claimed is:

1. A two-part curable liquid silicone composition comprising a first liquid composition (I) comprising components (A), (C), and (E) described below and a second liquid composition (II) comprising components (A) (B), (C), and (D) described below, which yields upon mixing a curable liquid silicone composition consisting essentially of (A) 100 parts by weight of an alkenyl-substituted polyorganopolysiloxane having a viscosity at 25° C. of 10 to 1,000,000 centipoise and containing at least 2 alkenyl groups in each molecule;

(B) a hydrogen-substituted organopolysiloxane having a viscosity at 25° C. of 1 to 10,000 centipoise and containing at least 2 silicon-bonded hydrogen atoms in each molecule, in an amount that provides 0.3 to 10 moles silicon-bonded hydrogen from component (B) per 1 mole alkenyl in component (A);

(C) 2 to 50 parts by weight of an inorganic filler that has a specific surface of 50 to 500 m²/g;

(D) 0.1 to 20 parts by weight of an alkoxy-substituted organopolysiloxane having a viscosity at 25° C. of 1 to 2,000 centipoise and containing at least 2 silicon-bonded alkoxy groups in each molecule; and (E) platinum catalyst in a quantity sufficient to cure the curable liquid silicone composition;

wherein the curable silicone composition that results when the first liquid composition (I) and the second liquid composition (II) are mixed, is thiotropic and has a viscosity, immediately upon mixing that is greater than the viscosity of the first liquid composition (I) and is greater than the viscosity of the second liquid composition (II).

2. The two-part composition of claim 1 wherein the alkenyl groups of component (A) are vinyl.

3. The two-part composition of claim 1 wherein the viscosity of the curable silicone composition that results when the first liquid composition (I) and the second liquid composition (II) are mixed is 1.3 to 30 times greater than the viscosity of the greater of the viscosities of the first liquid composition (I) or the second liquid composition (ii).

4. The two-part composition of claim 1 wherein component (A) has a substantially straight-chain structure.

5. The two-part composition of claim 1 wherein component (B) has a substantially straight-chain structure.

6. The two-part composition of claim 1 wherein the viscosity of the curable silicone composition that results when the first liquid composition (I) and the second liquid composition (II) are mixed is 1.5 to 20 times greater than the viscosity of the greater of the viscosities of the first liquid composition (I) or the second liquid composition (ii).

7. The two-part composition of claim 1 wherein component (C) is silica.

8. The two-part composition of claim 7 wherein component (C) is fumed silica.

9. The two-part composition of claim 1 wherein the component (C) has been treated with a surface treatment agent.

10. The two-part composition of claim 9 wherein the surface treatment agent is an organoalkoxysilane, an organochlorosilane, a silazane or an organosiloxane oligomer.

11. The two-part composition of claim 1 wherein the silicon-bonded alkoxy groups of component (D) are methoxy.

12. A two-part curable liquid silicone composition comprising a first liquid composition (I) comprising components (A), (C), and (E) described below and a second liquid composition (II) comprising components (A) (B), (C), and (D) described below, which yields upon mixing a curable liquid silicone composition comprising (A) 100 parts by weight of an alkenyl-substituted polyorganopolysiloxane having a viscosity at 25° C. of 10 to 1,000,000 centipoise and containing at least 2 alkenyl groups in each molecule;

(B) a hydrogen-substituted organopolysiloxane having a viscosity at 25° C. of 1 to 10,000 centipoise and containing at least 2 silicon-bonded hydrogen atoms in each molecule, in an amount that provides 0.3 to 10 moles silicon-bonded hydrogen from component (B) per 1 mole alkenyl in component (A);

(C) 2 to 50 parts by weight of an inorganic filler that has a specific surface area of 50 to 500 m²/g;

(D) 0.1 to 20 parts by weight of an alkoxy-substituted organopolysiloxane having a viscosity at 25° C. of 1 to 2,000 centipoise and containing at least 2 silicon-bonded alkoxy groups in each molecule; and (E) platinum catalyst in a quantity sufficient to cure the curable liquid silicone composition;

wherein the curable silicone composition that results when the first liquid composition (I) and the second liquid composition (II) are mixed, is thixotropic and has a viscosity, immediately upon mixing that is greater than the viscosity of the first liquid composition (I) and is greater than the viscosity of the second liquid composition (II); and wherein component (D) is a compound having the formula

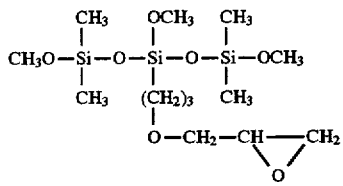

a compound having the formula

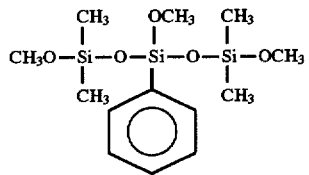

a compound having the formula

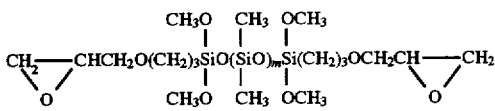

a compound having the formula

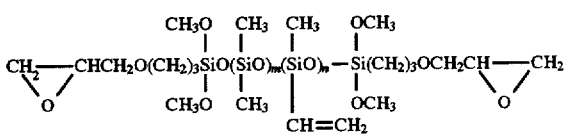

or a compound having the formula

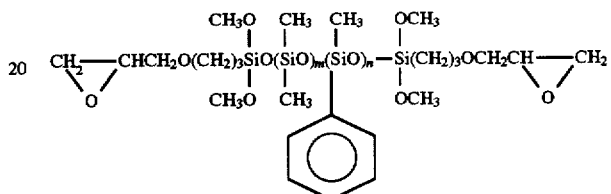

wherein m and n are integers with a value of at least 1.

* * * * *